United States Patent [19]
Saito

[11] Patent Number: 5,734,751
[45] Date of Patent: Mar. 31, 1998

[54] ELLIPSE-LIKE CURVE RECOGNITION BY CALCULATION OF DISTANCES OF POINTS ON THE CURVE FROM FOCI

[75] Inventor: Shigeru Saito, Tokyo, Japan

[73] Assignee: NEC Corporation, Tokyo, Japan

[21] Appl. No.: 505,537

[22] Filed: Jul. 21, 1995

[30] Foreign Application Priority Data

Jul. 22, 1994 [JP] Japan ................................. 6-171015

[51] Int. Cl.$^6$ ....................................... G06K 9/46
[52] U.S. Cl. ............................. 382/203; 382/286
[58] Field of Search ......................... 382/181, 199, 382/203, 215, 242, 286, 288

[56] References Cited

U.S. PATENT DOCUMENTS

| | | | |
|---|---|---|---|
| 4,618,989 | 10/1986 | Tsukune et al. | 382/203 |
| 5,186,711 | 2/1993 | Weiss et al. | 382/141 |
| 5,363,107 | 11/1994 | Gertz et al. | 342/26 |
| 5,469,537 | 11/1995 | Seki | 395/133 |

FOREIGN PATENT DOCUMENTS

| | | | |
|---|---|---|---|
| 58-223885 | 12/1983 | Japan | G06K 9/00 |
| 62-70988 | 4/1987 | Japan | 382/203 |

*Primary Examiner*—Andrew Johns
*Attorney, Agent, or Firm*—Foley & Lardner

[57] ABSTRACT

After calculation of coordinates of points on a plane curve, a pattern recognition device calculates (S3) coordinates of foci and a major axis of a candidate ellipse and, (S4) until all points are used, (S5) a sum of distances between said point and the foci. After calculation of (S6) of the sum to the major axis, (S7) a variance of such ratios is calculated to judge (S8) whether or not the plane curve is a geometric ellipse. A mean value may be substituted for the variance. The variance may be calculated as regards sums calculated for all points. Preferably, the foci and the major axis are calculated by calculating (S1) an inscribed and subsequently (S2) a circumscribed rectangle. In this event, the candidate ellipse is inscribed in the circumscribed rectangle.

33 Claims, 4 Drawing Sheets

ELLIPSE-LIKE CURVE RECOGNITION BY CALCULATION OF DISTANCES OF POINTS ON THE CURVE FROM FOCI

FIELD OF THE INVENTION

This invention relates to pattern recognition of an ellipse-like curve.

BACKGROUND OF THE INVENTION

Various pattern recognition methods and devices are known. In the manner which will later be described in greater detail, a pattern recognition device is disclosed as a stroke shape discriminating device in Japanese Patent Prepublication (A) No. 223,885 of 1983.

The stroke shape discriminating device is for discriminating a stroke among preselected shapes and for deciding parameters of the shape. The preselected shapes are a straight line, a polygonal line, an ellipse including a circle, and an arc. The above device comprises means for calculating coordinates of points on the stroke as a coordinate sequence, means for using the coordinate sequence in calculating parameters approximating each of the preselected shapes, means for calculating similarity measures between the coordinate sequence and the parameters approximating the preselected shapes, and means for selecting one of the preselected shapes that has a greatest similarity measure.

On applying the stroke shape discriminating device to discrimination of the stroke as one of ellipses, it is presumed that major and minor axes of the ellipses are parallel to coordinate axes. The coordinate sequence must therefore be subjected to an affine transformation before calculation of the parameters. This requires a great amount of calculation and an accordingly slow processing speed.

SUMMARY OF THE INVENTION:

It is consequently an object of the present invention to provide a pattern recognition method of recognizing an input pattern of a plane curve as an elliptic pattern, which method obviates a great amount of calculation.

It is another object of this invention to provide a pattern recognition method which is of the type described and which is operable at a high speed.

It is still another object of this invention to provide a pattern recognition method which is of the type described and which is readily operable even when the input pattern is similar to an ellipse having major and minor axes having a finite angle with coordinate axes.

It is yet another object of this invention to provide a pattern recognition method which is of the type described and which is readily operable even when the input pattern is similar to an arc of an ellipse having major and minor axes having a finite angle with the coordinate axes.

It is a further object of this invention to provide a pattern recognition device in which put into practice is a pattern recognition method of the type described.

Other objects of this invention will become clear as the description proceeds.

In accordance with an aspect of this invention, there is provided a pattern recognition method of recognizing an input pattern of a plane curve as an elliptic pattern, comprising the steps of: (A) calculating coordinates of points on the input pattern as a coordinate sequence; (B) calculating, by using the coordinate sequence, elliptic parameters including focus coordinates of foci of an ellipse; (C) calculating, by using the coordinate sequence and the focus coordinates, a sum of distances between each of the points and the foci; (D) subjecting the sum of distances to an algebraic calculation to calculate results of the algebraic calculation; and (E) evaluating an irregular distribution of the results as a similarity measure which the input pattern has relative to a geometric ellipse.

In accordance with a different aspect of this invention, there is provided a pattern recognition device for recognizing an input pattern of a plane curve as an elliptic pattern, comprising: (A) means for calculating coordinates of points on the input pattern as a coordinate sequence; (B) means for using the coordinate sequence in calculating elliptic parameters including focus coordinates of foci of an ellipse; (C) means for using the coordinate sequence and the focus coordinates in calculating a sum of distances between each of the points and the foci; (D) means for subjecting the sum of distances to an algebraic calculation to calculate results of the algebraic calculation; and (E) means for evaluating an irregular distribution of the results as a similarity measure which the input pattern has relative to a geometric ellipse.

In the aspects of this invention, the geometric ellipse can be either a circle or an arc of such a geometric ellipse. When the irregular distribution is greater than a predetermined degree, the input pattern is judged as a plane curve other than the geometric ellipse.

DESCRIPTION OF THE PREFERRED EMBODIMENTS

Figure 1:
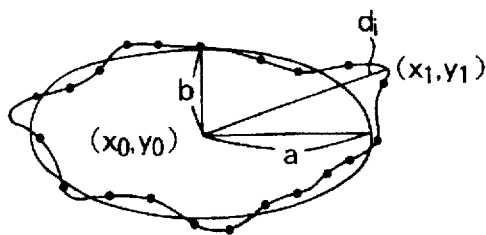
FIG. 1 exemplifies a plane curve for discrimination as an ellipse by a pattern recognition device to which the instant invention is applicable.

Referring to FIG. 1, a plane curve or stroke is a closed elliptic or ellipse-like curve which should be recognized regardless whether the plane curve is a geometrically exact ellipse. The plane curve is supplied to a pattern recognition device as an input pattern. The pattern recognition device first samples sampled points on or along the plane curve and calculates coordinates of the sampled points as a coordinate sequence on a coordinate plane which is presumed as defined by an orthogonal right-handed coordinate system of x and y axes merely for simplicity of the description. From the coordinate sequence, the pattern recognition device extracts characteristic features, such as the coordinates (x, y) of a vertex, of the plane curve.

Figure 2:
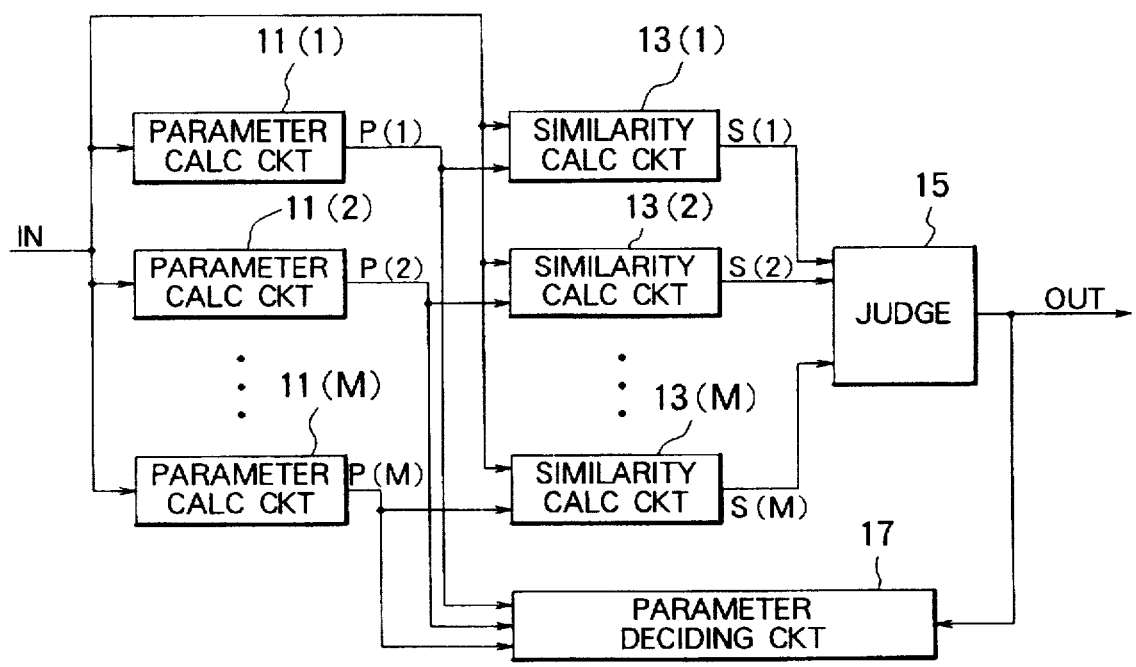
FIG. 2 is a block diagram of a conventional pattern recognition device.

Turning to FIG. 2 with FIG. 1 continuously referred to, a conventional pattern recognition device will be described in order to facilitate an understanding of the present invention. This pattern recognition device is disclosed as a stroke discriminating device in the Japanese Patent Prepublication cited above and is for discriminating a stroke among a plurality M of preselected shapes which may be a straight line, a polygonal line, an ellipse (a circle), and an arc. It should be noted that operation of the stroke discriminating device is unclear in the patent prepublication.

For supply to the stroke discriminating device, the stroke is preliminarily represented by an input sequence IN of a predetermined number N of sample coordinates $(x_n, y_n)$ of points sampled as sampled points from the stroke represented on a right-handed coordinate system of orthogonal x and y axes, where n is variable between 1 and N, both inclusive. The input sequence is delivered to first through M-th parameter calculating circuits 11(1), 11(2), ..., and 11(M), which will collectively be designated by a simple reference numeral 11. Similar simple reference numerals and symbols will be used hereafter. In the manner which will presently be described, the first through the M-th parameter calculating circuits 11 produce first through M-th shape parameters P(1), P(2), ..., P(M) or P.

Based on the input sequence and the shape parameters, first through M-th similarity calculating circuits 13(1), 13(2), ..., and 13(M) or 13 produce first through M-th similarity measures S(1), S(2), ..., and S(M) or S. A shape judging circuit 15 selects a maximum of the first through the M-th similarity measures and produces a device output signal OUT representative of one of the preselected shapes that is most similar in shape to the stroke. Incidentally, a parameter deciding circuit 17 is responsive to the first through the M-th shape parameters and to the device output signal to decide actual parameters of the stroke.

Referring to FIGS. 1 and 2, operation of the stroke discriminating device will be described in detail in connection with an m-th parameter calculating circuit 11(m) and an m-th similarity calculating circuit 13(m), where m represents a certain one of 1 through M, both inclusive. It will be assumed that the m-th parameter calculating circuit 11(m) is for an m-th preselected shape which is an ellipse represented by an equation:

$$(x(t)-x(0))^2/a^2+(y(t)-y(0))^2/b^2=1, \quad (1)$$

where a shape combination (x(t), y(t)) represents a point on the ellipse, a center combination (x(0), y(0)) represents an ellipse center depicted in FIG. 1, and a and b represent major and minor radii of the ellipse. It will furthermore be assumed merely for convenience of the description that N is an integral multiple of three. Four values of 1, N/3, 2N/3, and N will be selected and denoted by i. In this manner, several points are selected from the sampled points as selected points.

The m-th parameter calculating circuit 11(m) selects selected combinations $(x_i, y_i)$ from the input sequence and substitutes the selected combinations for the shape combination to calculate a substituted equation as an m-th shape parameter P(m). The substituted equation is given by using the sample coordinates as the shape combination in Equation (1) and represents an m-th approximated shape in cooperation with the ellipse center and the major and the minor radii.

The m-th similarity calculating circuit 13(m) calculates n-th calculated distances $d_n$ between the substituted equation and the sampled points. The calculated distances depend on the sample coordinates and are given by a formula:

$$((x_n-x(o))^2+(Y_n-y(0))^2 \cdot |1-ab/(a^2(y_n-y(0))^2+b^2(x_n-x(0))^2)^{1/2}|.$$

Subsequently, the m-th similarity calculating circuit 13(m) selects a maximum distance $d_i$ of the n-th calculated distances and divides 1 by the maximum distance to decide an m-th similarity measure S(m) by a quotient of this division. Somehow deciding an m-th correction factor C(m), the shape judging circuit 15 calculates products of such correction factors and similarity measures produced by ones of the similarity calculating circuits 11 that are used for like ellipses. Finding a maximum of the products, the shape judging circuit 15 produces as a candidate ellipse one of the preselected shapes that provides the similarity measure used in the maximum of products and is indicated by the device output signal. Description of the parameter deciding circuit 17 is herein omitted.

In the manner described hereinabove, the major and the minor radii of the ellipse are parallel to the x and the y axes. It is consequently indispensable to preliminarily subject to the affine transformation the coordinate sequence representative of an elliptic shape.

Figure 3:
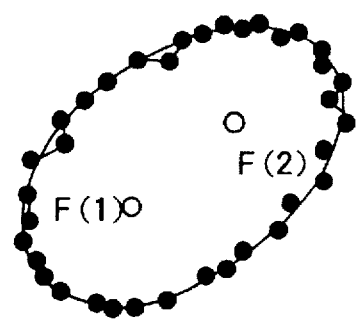
FIG. 3 exemplifies an elliptic input pattern for use in describing a pattern recognition device according to this invention.

Referring now to FIG. 3, an elliptic pattern is exemplified as a plane curve which should be recognized as a geometric ellipse by a pattern recognition device according to this invention. In contrast to the plane curve illustrated in FIG. 1, the geometric ellipse may have major and minor axes 2a and 2b which may or may not be parallel to the orthogonal x and y axes. In any event, the geometric ellipse has first and second foci F(1) and F(2). As in FIG. 1, a plurality of points are sampled on or along the elliptic pattern as sampled points and are represented by sample coordinates (x, y) to represent the elliptic pattern by a coordinate sequence. It is herein unnecessary that the number of the sampled points should be equal to a predetermined number of the type described before.

Figure 4:
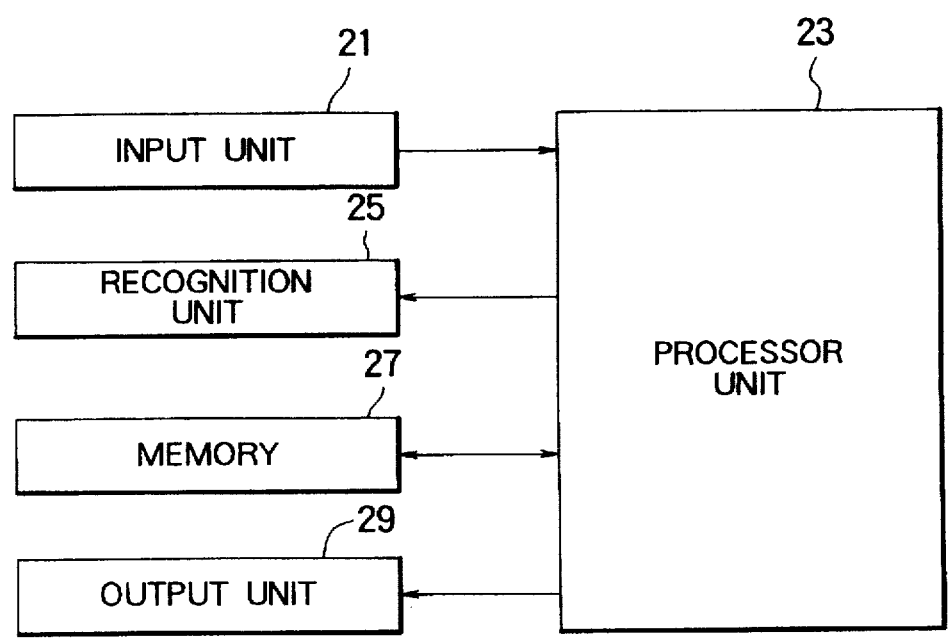
FIG. 4 is a block diagram of a pattern recognition device according to a first embodiment of this invention.

Turning to FIG. 4 with FIG. 3 continuously referred to, a pattern recognition device is according to a first embodiment of this invention and is for recognizing whether or not an input pattern is similar to a geometric ellipse. In order to produce the coordinate sequence described in the foregoing, the input pattern is traced by an input unit 21 which may be a pen input or a mouse.

As will be described in the following, a processor unit 23 processes the coordinate sequence into an eventual result of processing. Using the eventual result, a recognition unit 25 identifies the processed sequence as a candidate pattern.

The processor unit 23 furthermore serves to store the coordinate sequence and intermediate result of calculation in a memory 27 for use by the processor unit 23. An output unit 29 is for indicating a result of recognition of the input pattern by cooperation of the processor and the recognition units 23 and 25. The result of recognition may represent by predetermined indications the candidate pattern and the fact that the input pattern is similar to no geometrical ellipses.

Further turning to FIG. 5 with FIGS. 3 and 4 continuously referred to, operation of the processor unit 23 will be described. This operation starts when the coordinate sequence is supplied to the processor unit 23.

At a first step S1, an inscribed rectangle is calculated by the use of the coordinate sequence to have inscribed sides parallel to the major and the minor axes. It is unnecessary that the inscribed rectangle should exactly inscribe either the input pattern or a geometric ellipse. Calculation of only maximum x and y coordinates x(MAX) and y(MAX) and minimum x and y coordinates x(MIN) and y(MIN) is first sufficient. These coordinates are related to four vertexes of the inscribed rectangle. Arithmetic mean values of the maximum and the minimum x coordinates and of the maximum and the minimum y coordinates give a center combination (x(0), y(0)) representative of an ellipse center described in conjunction with FIGS. 1 and 2. Subsequently, orthogonal lines are calculated to pass through the ellipse center.

At a second step S2, a circumscribed rectangle is calculated in connection with the coordinate sequence to have circumscribed sides parallel to the major and the minor axes. Calculated are intercepts by the input pattern (the coordinate sequence) from the orthogonal lines. Longer and shorter intercepts give the major and the minor axes. Four end points of the intercepts are points at which the circumscribed sides are tangents to the coordinate sequence. From the longer and the shorter intercepts, focus combinations of the first and the second foci are calculated together with the major and the minor axes (e.g., 2*a* and 2*b* as shown in FIG 1 at a third step S3 as ellipse parameters. If calculated to inscribe the circumscribed rectangle, an ellipse serves as a candidate ellipse.

It is possible to calculate the inscribed and the circumscribed rectangle in various other manners. For example, the maximum x and y coordinates and the minimum x and y coordinates are used in calculating y coordinates of the maximum and the minimum x coordinates and x coordinates of the maximum and the minimum y coordinates. This provides the four vertexes of the inscribed rectangle. The four vertexes are used in calculating the four inscribed sides of the inscribed rectangles. This provides the calculation mentioned above as the first step S1.

Subsequently, continuing with the instant example, it is possible to proceed to the second step S2 as follows. A check is carried out whether or not there is at least one of the four sides of inscribed rectangle left that is not yet processed. If one side is found (YES), a normal to this one side from the sampled points is calculated. One of the sampled points that gives a maximum of such normals, gives an end point of either the major or the minor axis. When there remains no sides of the inscribed rectangle after repeated check (NO), the four end points are obtained. Calculation of the four circumscribed sides gives the circumscribed rectangle.

At a fourth step S4, check is carried out by using the coordinate sequence as regards whether or not there is at least one of the sampled points left that is not yet subjected to processing as follows. If there is one of the sampled points left (N), that sample point is used in calculating (at a fifth step S5 ) a sum of distances to the first and the second foci. At a sixth step S6, a ratio of the sum to the major axis is calculated. The sixth step S6 then returns to the fourth step S4 until there remains no sampled points (Y). Inasmuch as only algebraic calculations are used in the fifth and the sixth steps S5 and S6, it is possible to call such ratios as results of an algebraic calculation. If the input pattern is a geometrically exact ellipse, the results would have a common value.

At a seventh step S7, a variance of the results is calculated. It is possible to understand the variance as a similarity measure which the input pattern has relative to a geometric ellipse. At an eighth step S8, the processor unit 23 delivers the ellipse parameters and the variance to the recognition unit 25.

Turning back to FIG. 4, the description will proceed to a pattern recognition device according to a second preferred embodiment of this invention. This pattern recognition device is not different in structure from that illustrated turning to FIG. 4.

Referring afresh to FIG. 6 and again to FIGS. 3 through 5, operation will be described as regards the example being illustrated. Similar steps are designated by like reference symbols.

Figure 5:
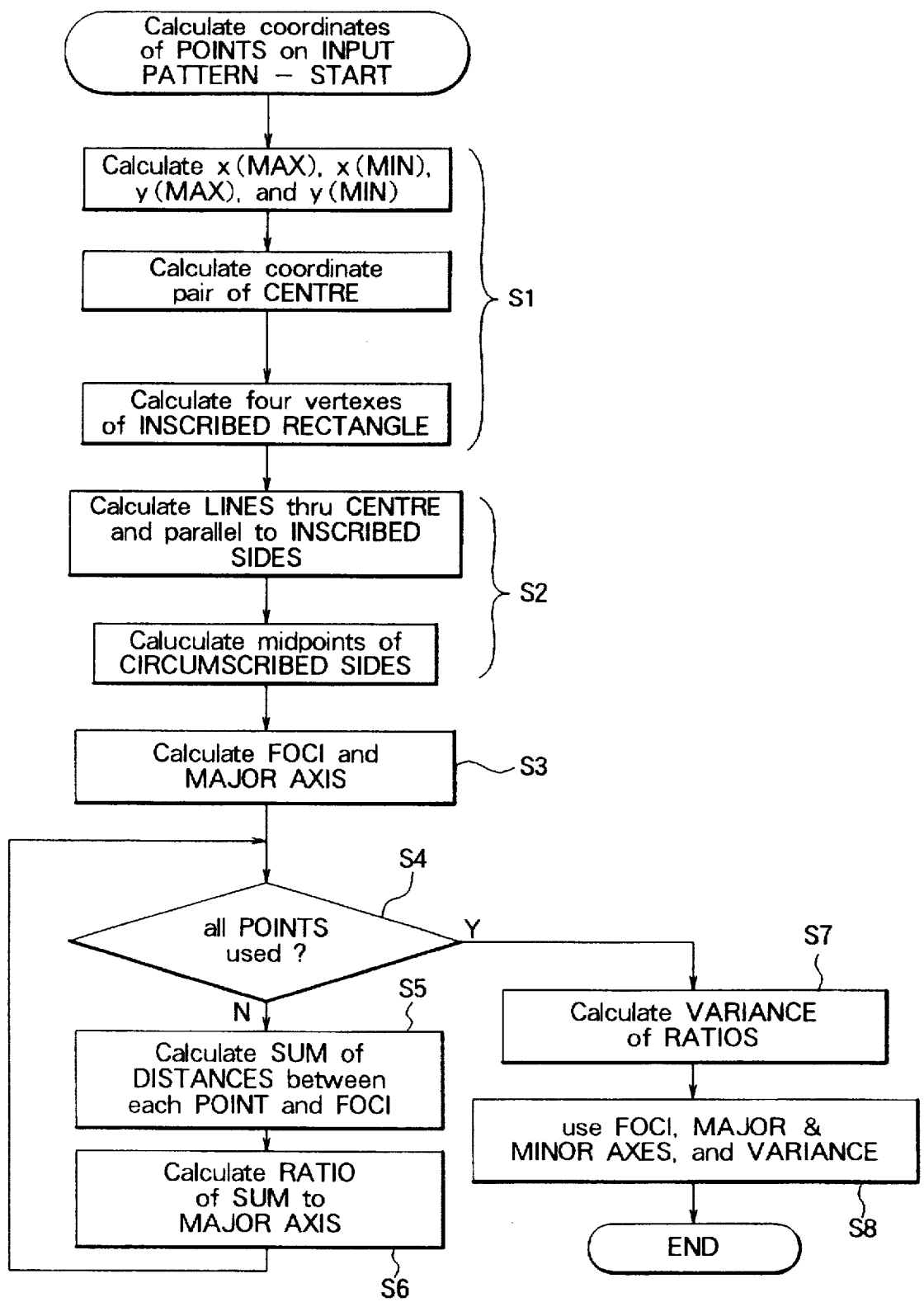
FIG. 5 shows a flow chart for use in describing operation of the device illustrated in FIG. 4.

First through eighth steps S1 to S8 are not different from those described in conjunction with FIG. 5. During the processing mentioned in connection with the fourth step S4 of FIG. 5, additional steps are added in FIG. 6 as follows.

At a first additional step AS1, a check is carried out as to whether the ratio is between a predetermined range. The range is preferably between 0.85 and 1.15. If the ratio is not between the predetermined range (N), the processor unit 23 judges at a second additional step AS2 that the input pattern is not similar to an ellipse. Operation of the processor unit 23 comes to an end. This judgement is carried out by the recognition unit 25. If the ratio is within the predetermined range (Y), the first additional step AS1 returns to the fourth step S4.

Figure 6:
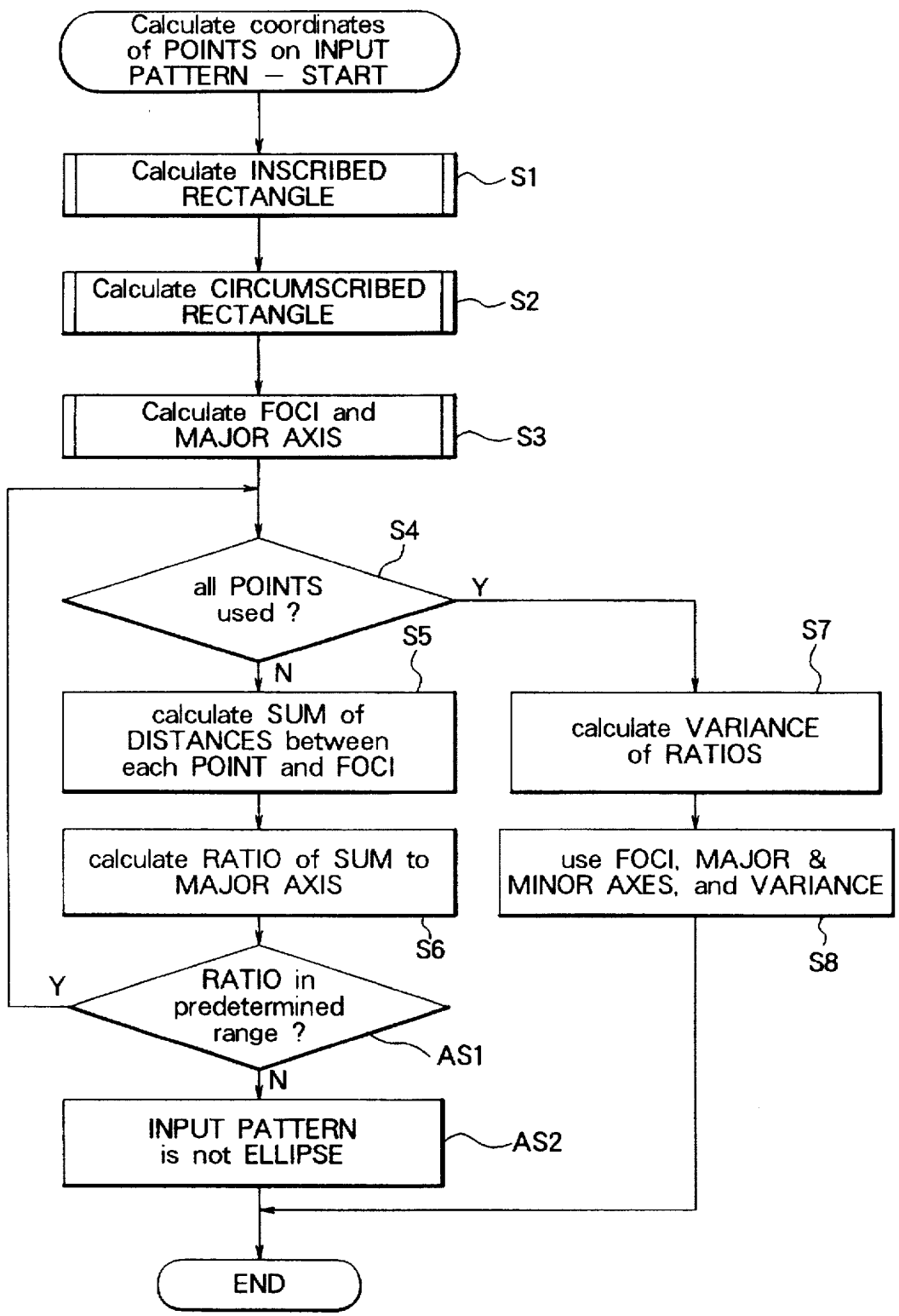
FIG. 6 shows a flow chart for use in describing operation of a pattern recognition device according to a second embodiment of this invention.

In FIG. 6, it should be pointed out that it does not take much time in processing the first and the second additional steps AS1 and AS2. The seventh and the eighth steps S7 and S8 need not be processed if the input pattern is dissimilar to an ellipse. This gives a higher speed of operation to the pattern recognition device.

Reviewing FIGS. 3 through 6, it is readily possible to implement the processor unit 23 by a microprocessor. The recognition unit 25 can be included in the microprocessor. It is moreover possible in FIGS. 5 and 6 to calculate the variance at the seventh step S7 directly with regard to a summation of the sum of distances without calculating the ratio at the sixth step S6. Moreover, it is possible in the seventh step S7 to evaluate a degree of irregular distribution of the results of arithmetic calculation.

While this invention has thus far been described in specific conjunction with only two preferred embodiments thereof, it is now readily possible for one skilled in the art to carry this invention into effect in various other manners. For example, it is possible to use an arithmetic mean value of the sums of distances instead of calculating the variance of the summation. The geometric ellipse may be a circle or an arc of an ellipse or circle provided that the arc has a sufficient length to calculate foci of an ellipse or to extrapolate for calculation of such foci.

What is claimed is:

1. A pattern recognition method of recognizing an input pattern of a plane curve traced by an input device as an elliptic pattern, comprising the steps of:

calculating coordinates of points on said input pattern as a coordinate sequence;

calculating, by using said coordinate sequence, elliptic parameters including focus coordinates of foci of an ellipse;

calculating, by using said coordinate sequence and said focus coordinates, a sum of distances between each of said points and said foci;

subjecting said sum of distances to an algebraic calculation to calculate results of said algebraic calculation; and evaluating an irregular distribution of said results as a similarity measure which said input pattern has relative to a geometric ellipse.

2. A pattern recognition method as claimed in claim 1, wherein said step of evaluating the irregular distribution comprises calculating a variance of said results in order to evaluate said irregular distribution.

3. A pattern recognition method as claimed in claim 2, wherein said step of evaluating the irregular distribution further comprises calculating an arithmetic mean value of the sums calculated by said step of calculating the said points the sum of distances, wherein each of said points are successively used one at a time.

4. A pattern recognition method as claimed in claim 3, wherein:

said step of calculating the elliptical parameters comprises calculating a length of a major axis;

said step of subjecting further comprises the steps of:
  calculating a ratio of said sum of distances to said length of major axis; and
  repeating said step of calculating the ratio until all of said points are used;
said pattern recognition method further comprising, between said step of calculating the ratio and said step of calculating the variance, the steps of:
  checking whether said ratio is within a predetermined range;
  suspending recognition of said input pattern when said ratio is outside said predetermined range; and
  processing to said step of calculating the variance when said ratio is within said predetermined range.

5. A pattern recognition method as claimed in claim 4, wherein said predetermined range is between 0.85 and 1.15.

6. A pattern recognition method as claimed in claim 4, wherein said step of calculating elliptic parameters further comprises the steps of:
  calculating, by using said coordinate sequence, an inscribed rectangle inscribed in said input pattern;
  calculating, by using said coordinate sequence and said inscribed rectangle, a circumscribed rectangle circumscribing said input pattern; and
  calculating, by using said coordinate sequence and said circumscribed rectangle, said focus coordinates and said length of major axis.

7. A pattern recognition method as claimed in claim 6, wherein said coordinates of points on said input pattern comprising x and y coordinates of each of said points in an orthogonal xy coordinate system, and wherein said step of calculating the inscribed rectangle further comprises the steps of:
  calculating maximum and minimum x coordinates and maximum and minimum y coordinates among the x and y coordinates of said points;
  calculating, as center x and y coordinates of a center of said inscribed rectangle, an x mean value of said maximum and said minimum x coordinates and a y mean value of said maximum and said minimum y coordinates;
  calculating, by using said coordinate sequence and said maximum and said minimum x coordinates, y coordinates of two of four vertexes of said inscribed rectangle having said maximum and said minimum x coordinates as x coordinates of said two of four vertexes;
  calculating, by using said coordinate sequence and said maximum and said minimum y coordinates, x coordinates of two others of said four vertexes having said maximum and said minimum y coordinates as y coordinates of said two others of four vertexes;
  whereby said inscribed rectangle is defined by the x and the y coordinates of said four vertexes.

8. A pattern recognition method as claimed in claim 7, wherein said step of calculating the circumscribed rectangle further comprises the steps of:
  calculating, by using said center x and y coordinates and the x and the y coordinates of said four vertexes, orthogonal lines passing through said center of said inscribed rectangle parallel to inscribed sides, each inscribed side passing through two adjacent ones of said four vertexes; and
  calculating, by using said coordinate sequence and said orthogonal lines, four points of intersection of said input pattern with said orthogonal lines;
  whereby said circumscribed rectangle is defined by said orthogonal lines and said four points.

9. A pattern recognition method as claimed in claim 7, wherein said step of calculating the elliptic parameters further comprises the steps of:
  calculating, by using said four points of intersection, a longer intercept and a shorter intercept of said input pattern with said orthogonal lines to use said longer intercept as said major axis; and
  calculating said focus coordinates by using said orthogonal lines and said longer and said shorter intercepts;
  whereby said elliptic parameters are defined by said focus coordinates and said longer and said shorter intercepts.

10. A pattern recognition method as claimed in claim 2, wherein:
  said step of calculating elliptic parameters comprises calculating said focus coordinates and a length of a major axis of the ellipse having said foci;
  said step of subjecting comprises calculating ratios as said results of algebraic calculation, each ratio being said sum of distances to said length of major axis.

11. A pattern recognition method as claimed in claim 10, wherein said step of calculating elliptic parameters further comprises the steps of:
  calculating, by using said coordinate sequence, an inscribed rectangle inscribed in said input pattern;
  calculating, by using said coordinate sequence and said inscribed rectangle, a circumscribed rectangle circumscribing said input pattern; and
  calculating, by using said coordinate sequence and said circumscribed rectangle, said focus coordinates and said length of major axis.

12. A pattern recognition method as claimed in claim 11, wherein said coordinates of points on said input pattern comprising x and y coordinates of each of said points in an orthogonal x and y coordinate system, and wherein said step of calculating the inscribed rectangle further comprises the steps of:
  calculating maximum and minimum x coordinates and maximum and minimum y coordinates among the x and y coordinates of said points;
  calculating, as center x and y coordinates of a center of said inscribed rectangle, an x means value of said maximum and said minimum x coordinates and a y mean value of said maximum and said minimum y coordinates;
  calculating, by using said coordinate sequence and said maximum and said minimum x coordinates, y coordinates of two of four vertexes of said inscribed rectangle having said maximum and said minimum x coordinates as x coordinates of said two of four vertexes; and
  calculating, by using said coordinate sequence and said maximum and said minimum y coordinates, x coordinates of two others of said four vertexes having said maximum and said minimum y coordinates as y coordinates of said two others of four vertexes;
  whereby said inscribed rectangle is defined by the x and the y coordinates of said four vertexes.

13. A pattern recognition method as claimed in claim 12, wherein said step of calculating the circumscribed rectangle further comprises the steps of:
  calculating, by using said center x and y coordinates and the x and the y coordinates of each four vertexes, orthogonal lines passing through said center of said inscribed rectangle parallel to inscribed sides, each inscribed side passing through two adjacent ones of said four vertexes; and calculating, by using said coordinate sequence and said orthogonal lines, four points of intersection of said input pattern with said orthogonal lines;

whereby said circumscribed rectangle is defined by said orthogonal lines and said four points.

14. A pattern recognition method as claimed in claim 13, wherein said step of calculating elliptic parameters further comprises the steps of:

calculating, by using said four points of intersection, a longer intercept and a shorter intercept of said input pattern with said orthogonal lines to use said longer intercept as said major axis; and calculating said focus coordinates by using said orthogonal lines and said longer and said shorter intercepts;

whereby said elliptic parameters are defined by said focus coordinates and said longer and said shorter intercepts.

15. A pattern recognition method as claimed in claim 2, wherein said step of evaluating the irregular distribution patterns further comprises calculating as said results, sums calculated by said step of calculating the sum of distances, wherein each of said point is successively used one at a time.

16. A pattern recognition method as claimed in claim 1, wherein said input device comprisies one of the mouse and a pen input.

17. A pattern recognition device for recognizing an input pattern of a plane curve traced by an input device as an elliptic pattern, comprising:

means for calculating coordinates of points on said input pattern as a coordinate sequence;

means for using said coordinate sequence in calculating elliptic parameters including focus coordinates of foci of an ellipse;

means for using said coordinate sequence and said focus coordinates in calculating a sum of distances between each of said points and said foci;

means for subjecting said sum of distances to an algebraic calculation to calculate results of said algebraic calculation; and means for evaluating an irregular distribution of said results as a similarity measure of said input pattern relative to a geometric ellipse.

18. A pattern recognition device as claimed in claim 17, wherein said means for evaluating calculates an arithmetic mean value of said results for use in evaluating said irregular distribution.

19. A pattern recognition device as claimed in claim 18, wherein said means for subjecting calculates as said results, sums calculated by said means for calculating the sum of distances, wherein each of said points is successively used one at a time.

20. A pattern recognition device as claimed in claim 17, wherein said means for evaluating the irregular distribution comprises means for calculating a variance of said results for use in evaluating said irregular distribution.

21. A pattern recognition device as claimed in claim 20, wherein:

said means for calculating elliptic parameters further comprises means for calculating said focus coordinates and a length of a major axis of the ellipse having said foci;

said means for subjecting being for calculating ratios as said results of algebraic calculation, each ratio being said sum of distances to said length of major axis.

22. A pattern recognition device as claimed in claim 21, wherein said means for calculating elliptic parameters further comprises:

means for using said coordinate sequence in calculating an inscribed rectangle inscribed in said input pattern;

means for using said coordinate sequence and said inscribed rectangle in calculating a circumscribed rectangle circumscribing said input pattern; and means for using said coordinate sequence and said circumscribed rectangle in calculating said focus coordinates and said length of major axis.

23. A pattern recognition device as claimed in claim 22, wherein said coordinates of points comprising x and y coordinates of each of said points in an orthogonal xy coordinate system, and wherein said means for calculating the inscribed rectangle further comprises:

means for calculating maximum and minimum x coordinates and maximum and minimum y coordinates among the x and y coordinates of said points;

means for calculating, as center x and y coordinates of a center of said inscribed rectangle, an x mean value of said maximum and said minimum x coordinates and a y mean value of said maximum and said minimum y coordinates;

means for using said coordinate sequence and said maximum and said minimum x coordinates in calculating y coordinates of two of four vertexes of said inscribed rectangle having said maximum and said minimum x coordinates as x coordinates of said two of four vertexes; and means for using said coordinate sequence and said y coordinates in calculating x coordinates of two others of said four vertexes having said maximum and said minimum y coordinates as y coordinates of said two others of said four vertexes;

whereby said inscribed rectangle is defined by the x and y coordinates of said four vertexes.

24. A pattern recognition device as claimed in claim 23, wherein said means for calculating the circumscribed rectangle further comprises:

means for using said center x and y coordinates and the x and the y coordinates of said four vertexes in calculating orthogonal lines passing through said center of said inscribed rectangle parallel to inscribed sides, each inscribed side passing through two adjacent ones of said four vertexes; and means for using said coordinate sequence and said orthogonal lines in calculating four points of intersection of said input pattern with said orthogonal lines;

whereby said circumscribed rectangle is defined by said orthogonal lines and said four points.

25. A pattern recognition device as claimed in claim 24, wherein said means for calculating elliptic parameters further comprises:

means for using said four points of intersection in calculating a longer intercept and a shorter intercept of said input pattern with said orthogonal lines to use said longer intercept as said length of major axis; and means for using said orthogonal lines and said longer and shorter intercepts in calculating said focus coordinates;

whereby said elliptic parameters are defined by said focus coordinates and said longer and shorter intercepts.

26. A pattern recognition device as claimed in claim 21, wherein:

said means for subjecting comprises:

means for calculating a ratio of said sum of distances to said length of major axis; and means for repeatedly activating said ratio calculating means until all of said points are calculated;

said pattern recognition device further comprising, between said means for calculating the ratio and said means for calculating the variance means for checking whether said ratio is within a predetermined range;

means for suspending operation of said means for subjecting and said means for evaluating when said ratio is outside said predetermined range; and means for continuing operation of said means for subjecting and said means for evaluating when each of said ratios is within said predetermined range.

27. A pattern recognition device as claimed in claim 26, wherein said predetermined range is between 0.85 and 1.15.

28. A pattern recognition device as claimed in claim 26, wherein said means for calculating elliptic parameters further comprises:

means for using said coordinate sequence in calculating an inscribed rectangle inscribed in said input pattern;

means for using said coordinate sequence and said inscribed rectangle in calculating a circumscribed rectangle circumscribing said input pattern; and means for using said coordinate sequence and said circumscribed rectangle in calculating said focus coordinates and said length of major axis.

29. A pattern recognition device as claimed in claim 26, wherein said coordinates of points on said input pattern comprising x and y coordinates of each of said points in an orthogonal xy coordinate system, and wherein said means for calculating the inscribed rectangle further comprises:

means for calculating maximum and minimum x coordinates and maximum and minimum y coordinates among the x and y coordinates of said points;

means for calculating, as center x and y coordinates of a center of said inscribed rectangle, an x mean value of said maximum and said minimum x coordinates and a y mean value of said maximum and said minimum y coordinates;

means for using said coordinate sequence and said maximum and said minimum x coordinates in calculating y coordinates of two of four vertexes of said inscribed rectangle having said maximum and said minimum x coordinates as x coordinates of said two of four vertexes; and means for using said coordinate sequence and said maximum and said minimum y coordinates in calculating x coordinates of two others of said four vertexes having said maximum and said minimum y coordinates as y coordinates of said two others of said four vertexes;

whereby said inscribed rectangle is defined by the x and y coordinates of said four vertexes.

30. A pattern recognition device as claimed in claim 29, wherein said means for calculating the circumscribed rectangle further comprises:

means for using said center x and y coordinates and the x and the y coordinates of said four vertexes in calculating orthogonal lines passing through said center of said inscribed rectangle parallel to inscribed sides, each inscribed side passing through two adjacent ones of said four vertexes; and means for using said coordinate sequence and said orthogonal lines in calculating four points of intersection of said input pattern with said orthogonal lines;

whereby said circumscribed rectangle is defined by said orthogonal lines and said four points.

31. A pattern recognition device as claimed in claim 30, wherein said means for calculating elliptic parameters further comprises:

means for using said four points of intersection in calculating a longer intercept and a shorter intercept of said input pattern with said orthogonal lines to use said longer intercept as said length of major axis; and means for using said orthogonal lines and said longer and shorter intercepts in calculating said focus coordinates;

whereby said elliptic parameters are defined by said focus coordinates and said longer and shorter intercepts.

32. A pattern recognition device as claimed in claim 17, wherein said input device comprises one of a mouse and a pen input.

33. A programmed processor configured to perform pattern recognition of a traced input pattern of a plane curve as an elliptic pattern, comprising the steps of:

(a) calculating coordinates of points on said input pattern as a coordinate sequence;

(b) calculating elliptic parameters including focus coordinates and a major axis by using said coordinate sequence;

(c) calculating a sum of distances between one of said points on said traced input pattern and each of said focus coordinates by using said coordinate sequence and said focus coordinates;

(c) calculating a ratio of the sum of distances to the major axis;

(d) returning to step (c) until all of said points on said traced input pattern have been used as said one of said points on said traced input pattern;

(e) calculating a variance of said ratios; and (f) using said variance to perform pattern recognition of said elliptic pattern.

* * * * *